Patented June 16, 1925.

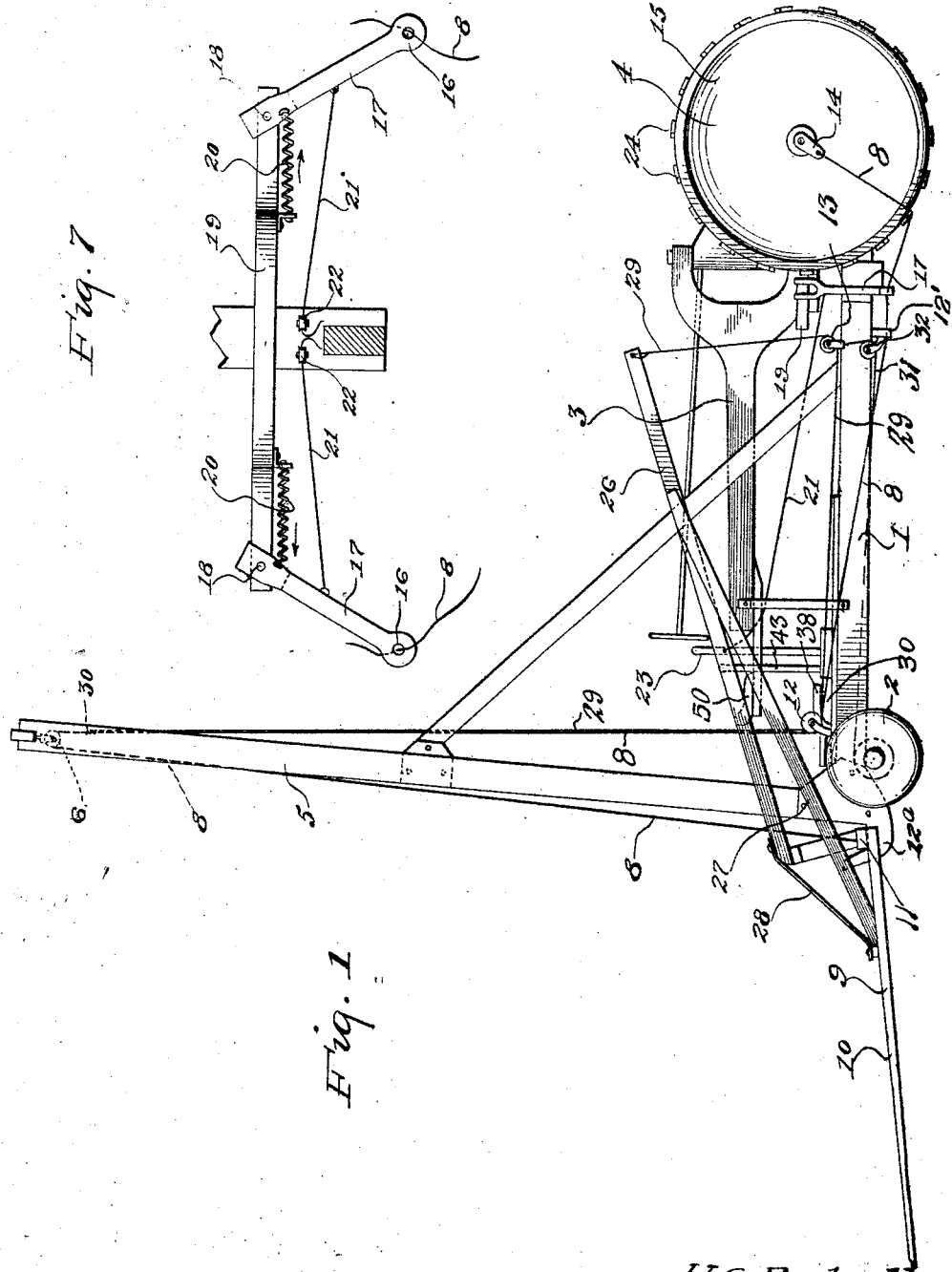

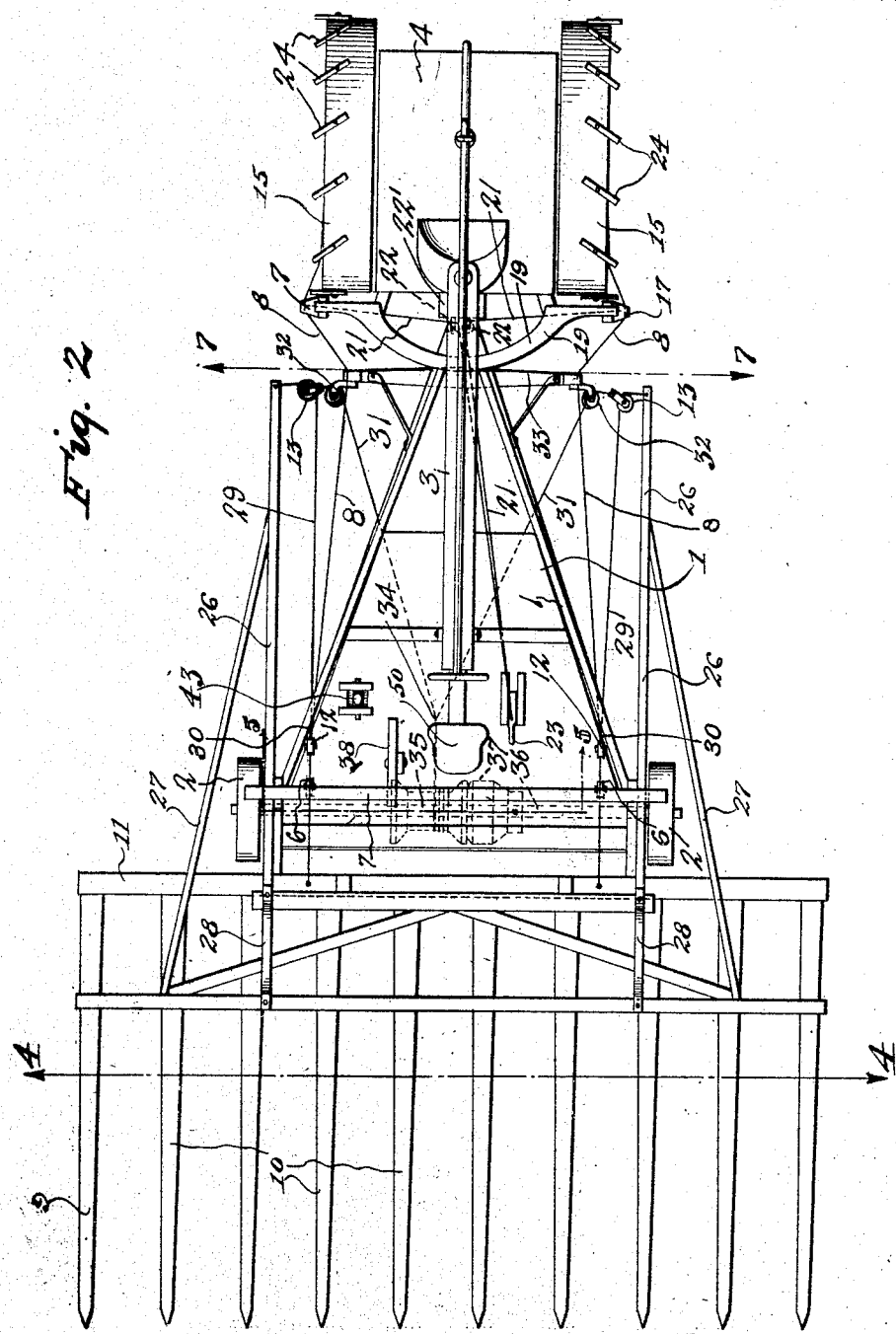

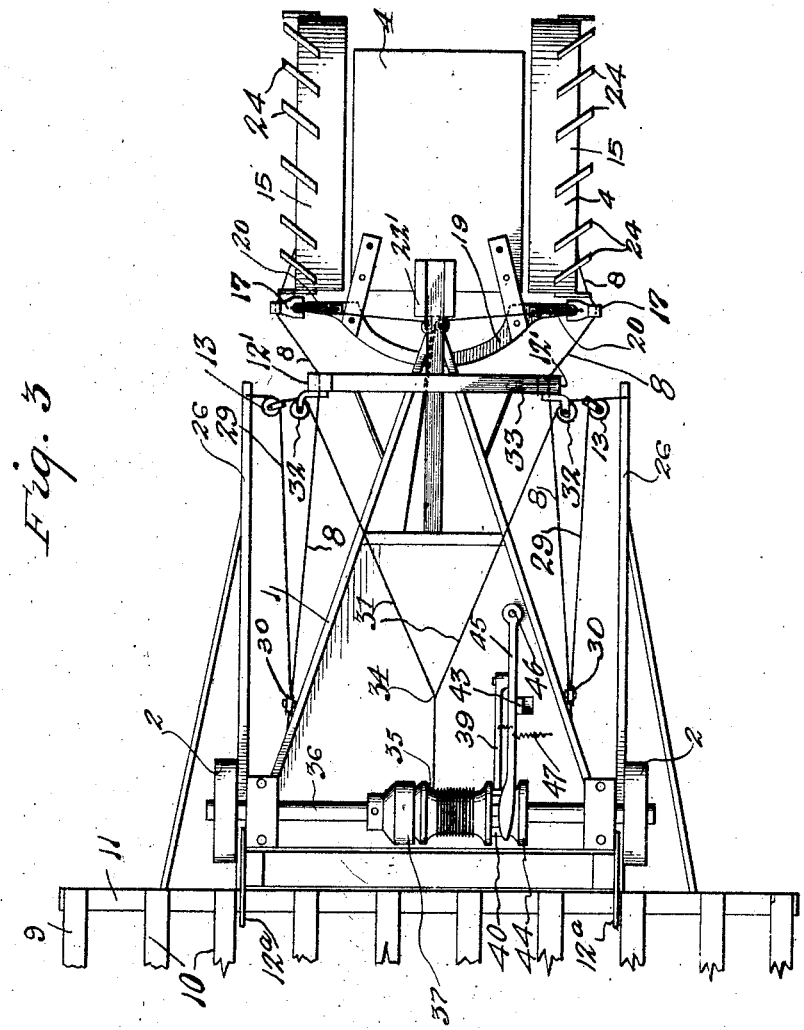

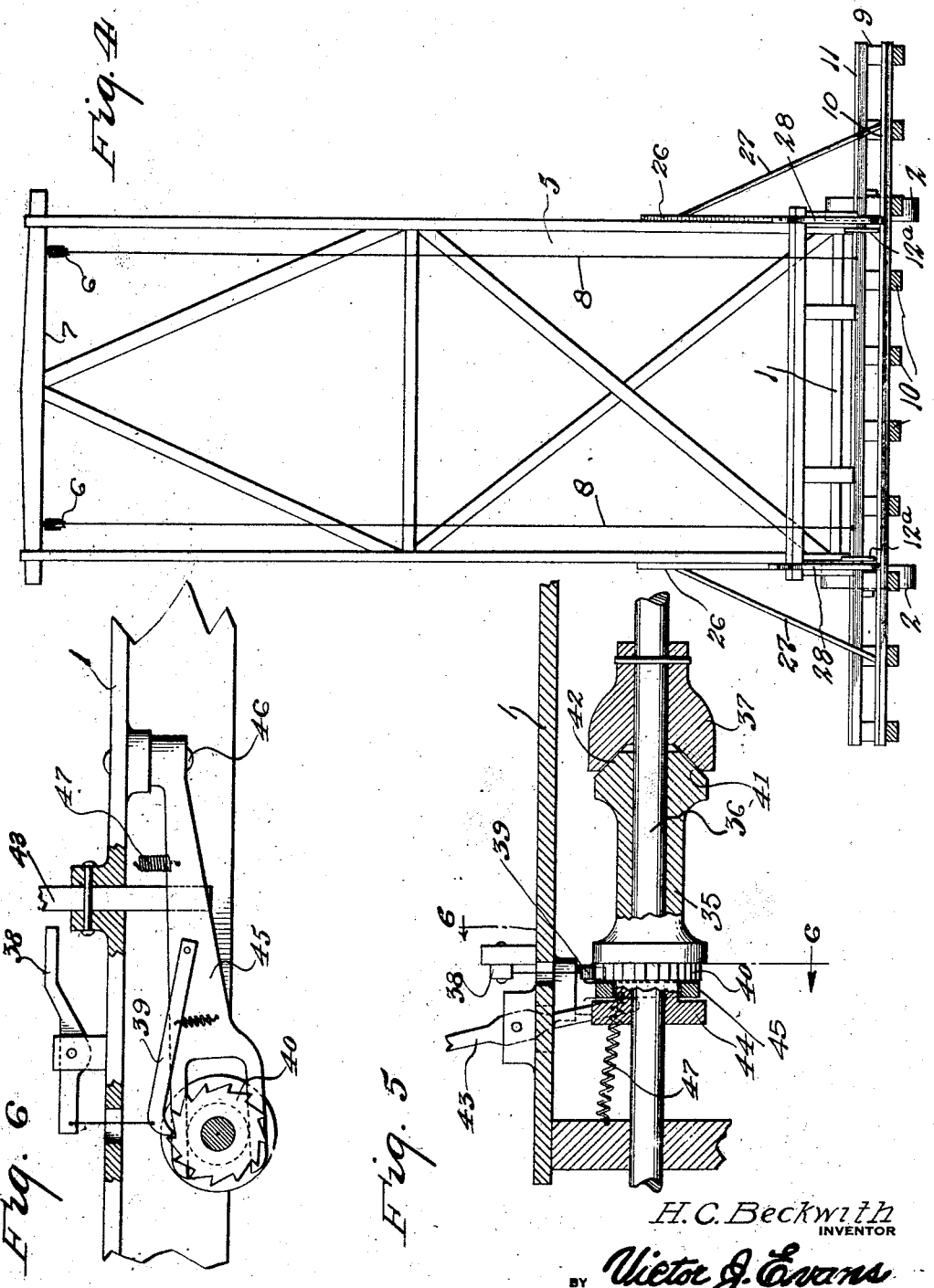

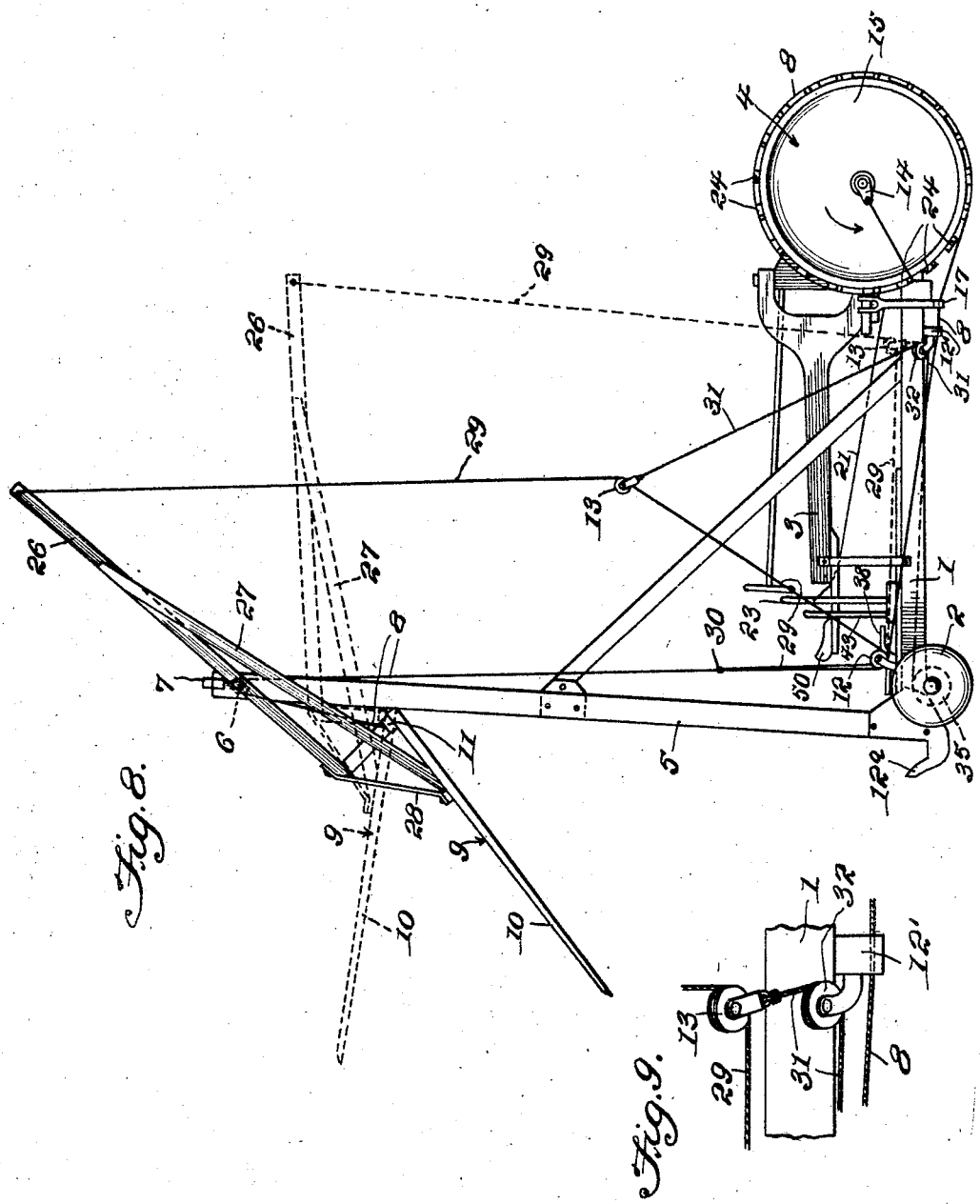

1,542,658

UNITED STATES PATENT OFFICE.

HILDRED C. BECKWITH, OF LINTON, INDIANA.

HAYSTACKER.

Application filed September 24, 1921. Serial No. 502,900.

*To all whom it may concern:*

Be it known that I, HILDRED C. BECKWITH, a citizen of the United States, residing at Linton, in the county of Greene and State of Indiana, have invented new and useful Improvements in Haystackers, of which the following is a specification.

This invention relates to haystackers of the power operated type and an object of the invention is to provide a haystacker which is designed for reducing manual labor needed upon a farm in properly putting up hay, the said stacker embodying a structure which will rake the hay and stack it, eliminating the need of one implement and the necessary man for pitching the hay.

More particularly the invention comprehends the provision of an implement which is tractor driven and by means of which the hay may be taken, in the field, from the swath or windrow and taken to a stack, elevated and deposited upon the stack, all of the above work being easily done by one man.

Another object of this invention is to provide a haying implement as specified which will deposit the hay upon the stack or load in flat flakelike bundles, preventing tangling and twisting of the hay and thereby materially increasing the ease with which the hay may be removed from the stack, and also to provide an implement which is constructed so that it can approach a stack from any side and deposit its load, thus keeping the stack even so it will settle straight, and also to provide a machine with which the foregoing operations may be completed in a relatively short space of time permitting saving of both time and labor in the haying harvest.

Other objects of the invention will appear in the following detailed description and in the accompanying drawing wherein:

Fig. 1 is a side elevation of the improved haystacker.

Fig. 2 is a top plan of the stacker.

Fig. 3 is a fragmentary bottom plan of the stacker.

Fig. 4 is a vertical section through the stacker taken on the line 4—4 of Fig. 2.

Fig. 5 is an enlarged fragmentary section through a part of the haystacker structure taken on the line 5—5 of Fig. 2.

Fig. 6 is a section substantially on the line 6—6 of Fig. 5 and showing the support of lever 43 in section.

Fig. 7 is a detail section on the line 7—7 of Fig. 2.

Figure 8 is a side elevation of the stacker showing the bull rake structure tilted to unloading position.

Figure 9 is a detail perspective showing the relative arrangement of certain cables.

Referring more particularly to the drawing the improved haystacker comprises a main supporting platform 1 which is supported at its rear end by suitable supporting wheels 2 and which is connected to the drawbar 3 of a two wheel tractor 4. The two wheel tractor 4 may be of any approved type which has sufficient power to operate the haying tool or implement. The haying tool has an upright 5 attached to the rear end of the supporting platform 1 and sheave pulleys 6 are rotatably supported by the top cross bar 7 of the upright 5 having ropes or cables 8 passing thereabout which are connected to the bull rake structure 9. The bull rake structure 9 comprises the usual teeth 10 and rake back 11 which latter rests in hooks 12$^a$ carried at the rear end of the platform 1, when in a hay receiving position. The ropes 8 pass downwardly from the pulleys 6, over guide pulleys 12 and through guides 12′ and are connected to arms 14 which are attached to the hubs of the wheels 15 of the tractor. The ropes 8 pass through eyes 16 formed in the outer free ends of arms 17 which are in turn pivotally connected as shown at 18 to a cross bar 19 carried at the rear end of the tractor 4. The arms 17 are normally urged outwardly by spiral springs 20 and they have ropes 21 connected thereto which pass about suitable guide pulleys 22, secured to an upright 22′ rising from the rear end of the structure, as shown in Figure 2 and are connected to a hand lever 23. When the hand lever 23 is moved rearwardly upon its pivot the arms 17 will be brought inwardly against the tension of the springs 20 which will cause the ropes 8 to be engaged by the circumferentially spaced laterally projecting cleats 24 which are mounted upon the perimeters of the wheels 15 of the tractor 4 so that as the tractor advances the ropes 8 will be wound about the wheels 15 which will raise the bull rake structure 9 vertically along the upright 5 for a raising a load of hay to deposit it upon a stack or wagon.

The bull rake structure 9 has forwardly extending arms 26 attached thereto which are braced by suitable braces 27 and 28. The arms 26 are positioned, one upon each side of the upright 5 and have ropes 29 connected to their ends remote from the rake structure. The ropes 29 are connected to the ropes 8 as shown at 30 and these points 30 of connection are in close proximity to the pulleys 6 when the rake 9 is in a hay receiving position. The pulleys 13, over which the ropes 29 pass, are carried by the ends of the ropes 31 as shown in Figure 3 of the drawings and which in turn pass about pulleys 32 supported from a suitable support 33 on the platform 1. The ropes 31 pass rearwardly from the pulleys 32 and are joined to each other as shown at 34 being wound upon a drum 35. The ropes 31 being wound upon the drum will draw upon the pulleys 33 through which the ropes 29 are passed and the ropes 8 and 29 being secured together as at 30, a pull upon the ropes 8, by being wound about the wheels 15, will cause a like pull upon the ropes 29, this pull will elevate the bull rake structure and the drum can be rotated to release the pull upon the ropes 29 and the rake structure will then be tilted to drop its load. The drum 35 is supported beneath the platform 1 and is rotatably mounted upon the axle 36 which carries the supporting wheels 2. A clutch 37 is provided for permitting rotation of the drum 35 by rotation of the axle 36 for winding the ropes 31 thereon. The ropes 31 and 29 are provided for maintaining the rake structure 9 in a load supporting position during its elevation and when the rake structure has been elevated to the desired height, the trip lever 38 is operated for moving the pawl 39 out of engagement with the ratchet 40 which will permit the unwinding of the ropes 31 from the drum 35 and allow the rake structure to tilt into a load depositing or delivering position. The ratchet 40 is carried by the drum 35 and the entire drum is shifted longitudinally for bringing its clutch face 41 into engagement with the clutch face 42 of a clutch structure 37 by pivotal movement of the shifting lever 43 which is connected to the collar 44 carried by the arm 45 which is pivotally supported as shown at 46 from the platform 1. A spring 47 is connected to the arm 45 for normally urging the clutch section 41 out of engagement with the clutch section 42.

A seat 50 of any approved type is supported above the platform 1 to permit the operation of the respective levers and trips used in the tool.

The driver or operator is located where he is in full control of the stacker structure and the tractor and where it will not be necessary for him to leave his seat during haystacking operation.

The process of taking up a load of hay from the windrow and delivering it to a stack or wagon is as follows:

The tractor and the stacker are driven forward from the stack to the windrow at one end of which the tractor is reversed so as to push the carrier or rake structure 9 along under the hay. After the proper load is received upon the rake or carrier the clutch lever 43 is operated for winding the ropes 31 on the drum. This action, will draw upon the ropes 29 which will raise the rake structure to a sufficient height through the medium of the ropes 8 to permit it to clear the ground. The gears of the tractor are then shifted and the latter is driven forwardly until close to the stack or wagon on which the hay is to be deposited, the tractor and stacker are then turned until the rake is straight with the stack after which the entire device is backed, in a straight line, to within about 20 or 30 feet of the stack at which point the elevating ropes 8 are lowered, by means of the hand lever 23, until they are engaged by certain of the cleats 24 and as the entire device travels inwardly towards the stack the elevating ropes are wrapped around the tractor wheels which raises the carrier or rake carrying the load of hay up along the upright 5 and at the same time backs it over the stack ready to slide the hay off upon the stack. When the proper position is reached, the trip 38 is operated which releases the ratchet pawl 39 from the ratchet 40 and allows the weight of the hay on the rake to tilt the rake, unwinding the ropes from the drum 35 and allowing the rake to tilt sufficiently to deposit the hay upon the stack or wagon. The delivering of the hay by the tilting of the rake structure permits the load of hay to slide off the rake upon the stack in a loose untangled flake permitting more even distribution of the hay, the proper squaring of the stack and also facilitates the removal of the hay from the stack. After the hay is deposited on the stack the stacker structure is driven forward at which time the rake or carrier will travel downwardly and take its loading position resting upon the hooks 12 and ready to be reloaded when the windrow is reached. The hay may be taken from the swath if desired, and in cases where the hay is sufficiently heavy to permit loading of the rake, thereby eliminating the need of raking the hay before it is loaded on to the stack.

From the foregoing description taken in connection with the accompanying drawing it will be apparent that a skillful operator may very quickly build up a stack of hay without help and in an efficient manner.

It is, of course, to be understood that the invention may be constructed in various other manners and the parts associated in different relations and, therefore, I do not desire to be limited in any manner except as set forth in the claims hereunto appended.

Having thus described my invention what I claim is:

1. In a haying tool, propelling means including traction wheels, a hay receiver and carrier, ropes connected to said receiver and carrier, means on said wheels for engaging said ropes and winding them about the wheels to raise said carrier into hay delivering position, and means for normally maintaining said ropes out of engagement with said last named means.

2. In a haying tool, propelling means including traction wheels, a hay receiving carrier, an upright, ropes connected to said carrier, cleats on said traction wheels, means for moving said ropes into engagement with certain of said cleats for winding the ropes around the traction wheels to raise said carrier into load delivering position.

3. In a haying tool, propelling means including traction wheels, a hay receiving carrier, an upright, ropes connected to said carrier, cleats on said traction wheels, means for moving said ropes into engagement with certain of said cleats for winding the ropes around the traction wheels to raise said carrier into load delivering position, and means for maintaining said carrier in load supporting position during its elevation along said upright.

4. In a haying tool, propelling means including traction wheels, a hay receiving carrier, an upright, ropes connected to said carrier, cleats on said traction wheels, means for moving said ropes into engagement with certain of said cleats for winding the ropes around the traction wheels to raise said carrier into load delivering position, balancing arms on said carrier, ropes connected to said balancing arms, a drum, said last named ropes connected to said drum and provided for maintaining the carrier in load supporting position during its elevation along said upright.

5. In a haying tool, propelling means including traction wheels, a hay receiving carrier, an upright, ropes connected to said carrier, cleats on said traction wheels, means for moving said ropes into engagement with certain of said cleats for winding the ropes around the traction wheels to raise said carrier into load delivering position, balancing arms on said carrier, ropes connected to said balancing arms, a drum, said last named ropes connected to said drum and provided for maintaining the carrier in load supporting position during its elevation along said upright, said drum releasable to permit tilting of the carrier by gravity into a hay delivering position.

6. In a haying implement, traction wheels, cleats carried by the perimeters of said wheels, and projecting laterally therefrom, a carrying rake, elevating ropes connected to said carrying rake and adapted to engage certain of said cleats for winding about said traction wheels to elevate the carrying rake.

7. In a haying implement, traction wheels, cleats carried by the perimeters of said wheels and projecting laterally therefrom, a carrying rake, elevating ropes connected to said carrying rake and adapted to engage certain of said cleats for winding about said traction wheels to elevate the carrying rake, pivoted arms, said ropes extending through said arms, said arms normally holding said ropes out of engagement with said cleats, and means for operating said arms to permit movement of the ropes into engagement with the cleats.

In testimony whereof I affix my signature.

HILDRED C. BECKWITH.